United States Patent
Anjum et al.

(10) Patent No.: US 6,967,957 B2
(45) Date of Patent: Nov. 22, 2005

(54) ARCHITECTURE FOR THE RAPID CREATION OF TELEPHONY SERVICES IN A NEXT GENERATION NETWORK

(75) Inventors: Farooq Anjum, Somerset, NJ (US); Francesco Caruso, Madison, NJ (US); Ravi Jain, Hoboken, NJ (US); Paolo Missier, Trenton, NJ (US); Adalberto Zordan, San Vito di Vigonza (IT)

(73) Assignee: Telcordia Technologies, Inc., Piscataway, NJ (US)

( * ) Notice: Subject to any disclaimer, the term of this patent is extended or adjusted under 35 U.S.C. 154(b) by 878 days.

(21) Appl. No.: 09/783,493

(22) Filed: Feb. 14, 2001

(65) Prior Publication Data

US 2001/0028654 A1 Oct. 11, 2001

Related U.S. Application Data

(63) Continuation of application No. 09/458,767, filed on Dec. 10, 1999, now abandoned.
(60) Provisional application No. 60/111,977, filed on Dec. 11, 1998.

(51) Int. Cl.[7] ............................................. H04L 12/66
(52) U.S. Cl. ...................... 370/401; 370/352; 719/328; 379/90.01; 379/93.01; 379/130; 379/157; 379/204.01; 379/207.02
(58) Field of Search ................................ 370/401, 352; 719/328, 310–320; 709/230; 379/201.01–218.02, 90.01–108.02, 130, 157

(56) References Cited

U.S. PATENT DOCUMENTS

| 5,875,234 A | * | 2/1999 | Clayton et al. ........... 379/93.05 |
| 6,269,254 B1 | | 7/2001 | Mathis ........................ 455/557 |
| 6,681,001 B1 | * | 1/2004 | Clayton et al. ........... 379/93.05 |

OTHER PUBLICATIONS

Sun's Java Telephony API (JTAPI) [S. Roberts, Essential JTAPI, Prentice Hall, 1998].
"CORBA Component" Developing Java Beans, R. Englander, Eds., O'Reilly & Associates; 1997; Java Beansä 1.01 specification, avaliable at http://java.sun.com/beans/doc/spec.html;pp. 1–114.
CORBA Component Model Draft Specification, available at http://www.omg.org/cgi–bin/doc?ptc/99–10–10), pp. 1–134.

* cited by examiner

*Primary Examiner*—St. John Courtrnay, III
(74) *Attorney, Agent, or Firm*—Joseph Giordano; James W. Falk

(57) ABSTRACT

A service architecture for the rapid development of next generation telephony services that overcomes the limitations of the current closed PSTN architecture and service model. In this architecture services are provided by multiple cooperating distributed service providers. This architecture is built upon an object-oriented call model which is defined as a small set of extensions to the standard Java Telephony API call model. This new object-oriented call model hides the detail of the underlying call-state management protocols and hardware from applications.

4 Claims, 6 Drawing Sheets

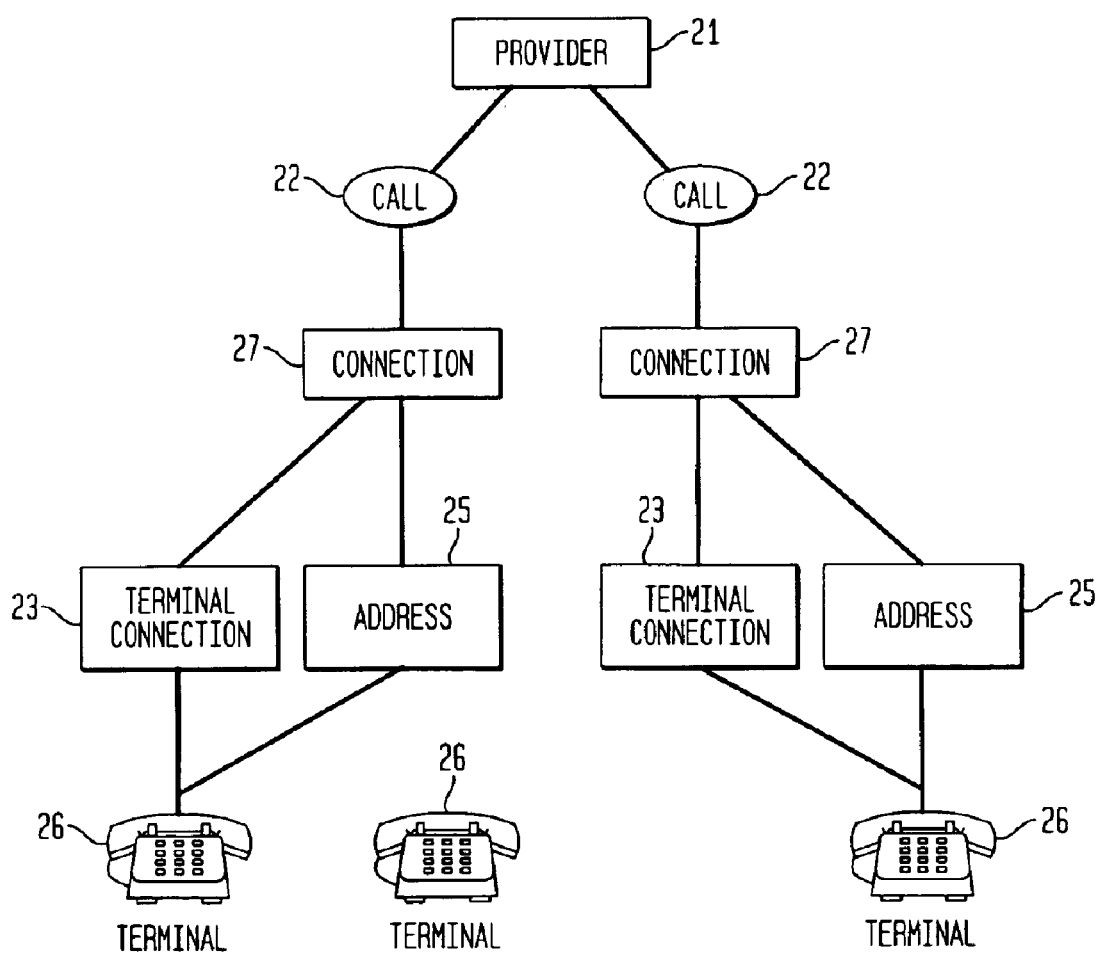

ARCHITECTURE FOR THE RAPID CREATION OF TELEPHONY SERVICES IN A NEXT GENERATION NETWORK

RELATED APPLICATIONS

This application is a continuation of U.S. patent application Ser. No. 09/458,767, filed Dec. 10, 1999, now abandoned, and claims priority to U.S. provisional patent application Ser. No. 60/111,977 filed on Dec. 11, 1998.

FIELD OF THE INVENTION

This invention relates to telecommunications services. More specifically, this invention relates to a service architecture for the rapid development and activation of telephone services in a packet based transport network during a telecommunication call as well as before the establishment of such a call.

BACKGROUND OF THE INVENTION

The evolution of the telecommunications network has undergone significant technological changes over this century and is in the process of another significant technological change, from a circuit based to a packet based transport media.

Initially the telecommunications networks were characterized by physical wires connecting each and every customer with telephone operators providing the intelligence to connect (switch) and to provide basic services to the phone customers. The operators established the phone calls, selected the best routes (i.e., connections) and provided the billing information. In short, the business and technical model for the telephone network rose from this physical reality and resulted in a network having the computational resources and service creation processes centralized. It was initially centralized in the embodiment of the telephone operators. With the introduction of electromechanical switches in the 1920s and the stored program controlled telephone switch in the 1960s, the fundamental model didn't change but the computational resources of the network were automated and then expanded to allow for more complex services.

The next change in the phone networks was the development and introduction of the Advanced Intelligent Network (AIN). The AIN architecture is characterized by the separation of the service development process from the switching process. It allowed service logic to be developed more quickly and placed in specialized network databases so that the complex stored program controlled switches could be optimized for speed and efficiency.

However, recent advances in hardware and software technology have resulted in another significant shift in the underlying architectural model for a telecom network. Specifically, the development of the internet and other fast packet switching and routing technologies have led to the design and implementation of high bandwidth packet networks to support voice, data and other high bandwidth applications. Also advances in technology have increased the computational resources available for Customer Premises Equipment (CPE) allowing service intelligence to be located in the CPE. Accordingly, intelligence can be less centralized and more distributed, both in the network and out to the customer premises.

Another way of looking at this evolution is that the Public Switched Telephone Network (PSTN) was and is network centric which assumes that the service logic for telephone services must reside within the network normally in the form of programmable network elements and of centralized systems such as the Intelligent Service Control Point (ISCP). On the other hand these new packet based networks are based on a technical and business model which is application centric in that the network passively provides connectivity among the various users and is largely unaware of the applications each user or host has implemented.

Market forces though are now calling for these two network models to converge with consequences on the way user services are defined, developed and deployed. In a broad sense, the two approaches are complementary and already converging. The PSTN, designed to provide primarily basic telephony, has been evolving to support new user-level intelligent services. For example, the ability to setup virtual phone numbers, whereby the selection of the actual number that gets connected when the virtual number is called, depends on user-defined service logic (e.g. based on the time of the day). The Internet, traditionally used for client-server and peer-to-peer data applications, is increasingly being used for telephony and telecommunications services. One of the expected results of this convergence is that it is likely that service logic will now be spread throughout the network. This means that rapid development and deployment of telephony services becomes possible, and that the network providers and service providers will no longer have to be the same entities.

As an example, FIG. 1 depicts an architecture which shows this convergence of the two networks. The PSTN 10 and the Internet 12 continue to co-exist and interface with each other through a gateway 14. A user 16 with this architecture is able to enjoy a variety of advanced services, some of which may be offered by a multiple of cooperating service provides that may or may not also be PSTN providers or Internet Service Providers. However, to provide such services, software running on terminals and software running on gateways need to inter-operate, and such service software needs to be portable.

The computer Telephony Integration (CTI) community has tried to develop call models and applications that are portable. The Internet Telephony (IT) community has been trying to develop protocols that allow interoperability. The CTI approach is oriented towards developing portable software for applications such as call centers, PBXs, etc. For example, Sun's Java Telephony API (JTAPI) [S. Roberts, Essential JTAPI, Prentice Hall, 1998] provides applications with a standard call model for maintaining call state, and it hides the hardware Application Programming Interface (API) or other API (e.g. TAPI, TSAPI, etc.) from the application. In contrast, the IT community is oriented towards developing protocols (e.g. SIP, H.323) that allow interoperability and communication between software running on user terminals or gateways.

JTAPI itself, while offering a convenient abstraction for thinking about next generation telephony and networking, is somewhat limited. In particular, JTAPI seems to be oriented towards providing support for developing applications in two types of scenarios: (1) where applications run on a single platform (e.g. a PBX); and (2) where applications run on a platform that is "horizontally partitioned", i.e., the higher layers of software (the application and the JTAPI layer) communicate via Java Remote Method Invocation (RMI) with the lower layers (e.g. TAPI and the hardware) over a network. Also, in JTAPI a service provider is assumed to be in control of all the parties in a call. While this assumption may add to the convenience of managing a centralized call center, it is not realistic in the broader setting of Internet Telephony.

What is needed is a distributed JTAPI that provides the communication support for multiple Providers to coordinate and interact in order to provide advanced services. For example, the JTAPI model assumes that the service provider object does not change throughout the lifetime of a Call. It is not clear how the JTAPI model could be used if the user wants to have different service providers for different portions of the network traversed by a single call or different legs of a multi-party call.

What is also needed are a method and system that enable a telecommunications subscriber during an established call or during the establishment of that call to obtain additional services or functions from possible multiple suppliers, which services or functions are not normally available to that subscriber.

It is therefore desirable to provide for a call model and service architecture which overcomes these limitations in the prior art.

SUMMARY OF THE INVENTION

Our invention is a service architecture characterized by different software entities which operate together to provide services in accordance with our inventive call model, which is herein referred to as a Java Call Control model. An Endpoint in our inventive architecture is an entity having a single unique logical address (which may be a phone number or an internet address) and which consists of one or more user terminals. A user terminal may be a telephone, a wireless handset, a laptop or a workstation. The user terminal interfaces with the network through terminal management (TM) software which runs on the user terminal or on a proxy server in the network. Providers are entities which manage disjoint sets of such addresses, called domains, and provide network connectivity and session management for the corresponding Endpoints. In this architecture telecom services can be hosted by Providers or directly by the TMs or both. The other software entities constituting our architecture represent the call as well as the connection legs. In our invention one Provider can be the source of a Java Call Control as well as a Connection object which would be used to manage the call processing logic. The JCC is a call model based on the JTAPI call model extended to provide for media negotiation during call setup.

BRIEF DESCRIPTION OF THE DRAWINGS

FIG. 2, depicts a prior art JTAPI call control model.

DETAILED DESCRIPTION OF THE INVENTION

Figure 1:
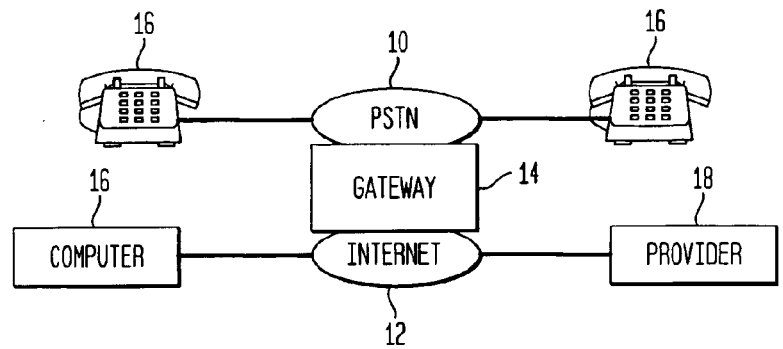
FIG. 1 depicts broadly a telecommunications system architecture wherein the PCTN and internet coexist but interface with each other and represents a type of system architecture to which our invention is applicable.

To understand our invention in detail, reference will be made to the preferred embodiment of our invention the example of which is illustrated in the accompanying drawings. First we describe our inventive Java Call Control model as embodied in a software object as it is used in our inventive architecture to implement service activation and deployment. Second we describe the network and service architecture with which our Java Call Model would operate.

A. Software Object

Our invention is a new call model we call the Java Call Control (JCC) model. Our JCC model is an extension of the JTAPI model to support media negotiation during call setup. This model hides the details of the underlying communication protocols and architectures. It does this by providing a suitable abstraction of the telephony network (the combined PSTN/IP network), and offers a high-level object model for maintaining and managing the state of a call session. Specifically, our inventive call model (JCC) builds upon complementary ideas developed by the Computer Telephony Integration (CTI) and Information Technology (IT) communities.

The main goals of the JCC in accordance with our invention are to: (1) provide for greater flexibility in service deployment and activation, e.g. support dynamic service download, one-time service activation, and, in accordance with a particular aspect of our invention, multiple parallel sessions between various users; (2) facilitate rapid development of applications by providing higher-layer abstractions (rather than simply sockets or JTAPI); (3) provide application portability across various communication protocols, e.g. SIP or H.323, and across platforms, using Java.

The Java Telephony API (JTAPI), is a portable, object-oriented interface for Java-based computer-telephony applications. This API defines a core call model to support basic call setup and a number of extensions, mostly designed to model call center features, multi-party conference calls, call routing, etc. This core model consists of a few telephony classes and their relationships, and the software objects are as shown in FIG. 2. The Provider 21 is an abstraction of a telephony service provider. A Provider 21 manages Call objects 22, representing calls at various stage of progress. Terminal objects 26 represent the physical endpoint of a call, while Address objects 25 are logical endpoints. Notice that each Address object 25 can be associated with multiple Terminals 26 and vice versa, reflecting the standard configuration for a call center. The Connection object 27 models the logical relationship between a Call object 22 and an Address object 25. For a multi-party call, one Connection object is associated to each leg of the call. Finally, a Terminal Connection 23 represents the relationship between one Connection 27 and one physical terminal 26.

Figure 3:
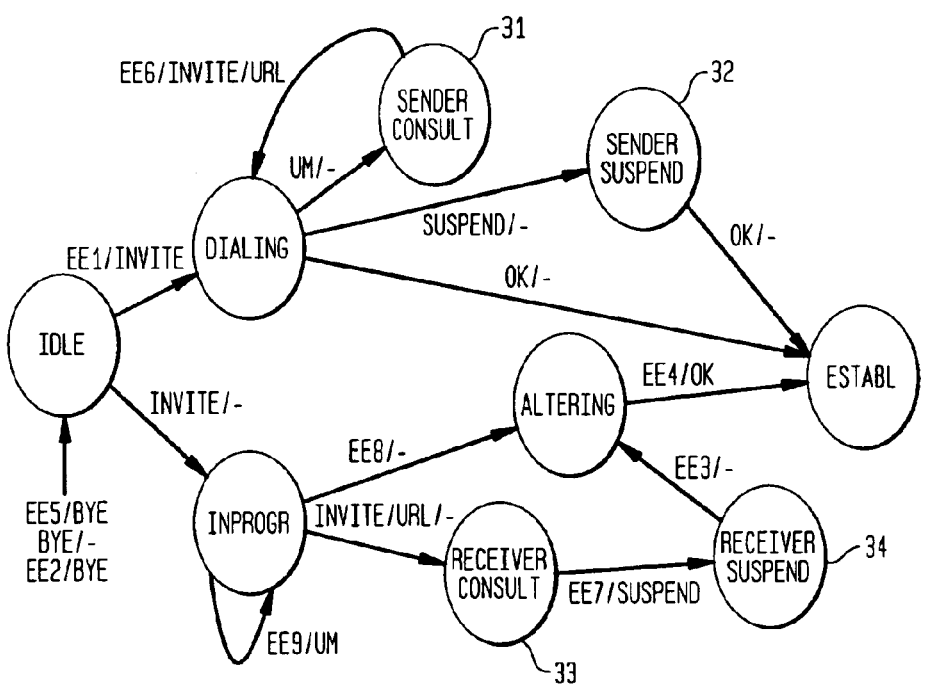
FIG. 3 depicts the state machine for our inventive call model.

The state of a telephone call is maintained by finite state machines associated with Call, Connection and Terminal connection objects (e.g., when a call is answered by the called party, the originating Connection moves to the CONNECTED state). The complete definition of the state machines is part of the published JTAPI specifications. However, in accordance with our invention, we have extended the state machine on the Connection object to include four new states. FIG. 3 depicts this new call state machine in accordance with our invention. The new states introduced are Sender__Consult (31), Sender__Suspend (32), Receiver__Consult (33), and Receiver__Suspend (34). All state transitions occur in response to events that are generated by the parties involved. One instance of the state machine is instantiated for each connection (leg) of a call. The sender and receiver states are used by the caller's and receiver's connections, respectively.

Table I below shows the state transitions.

TABLE I

1. EE1: Caller initiates call attempts.
2. EE2: Time Out.
3. EE3: Called party concludes action (e.g. download).
4. EE4: Called party accepts call.
5. EE5: User hangs up.
6. EE6: Suggest action (e.g. URL for download) to called party.
7. EE7: Called party authorization.
8. EE8: Called party supports media.
9. EE9: Called party does not support media.

Figure 6:
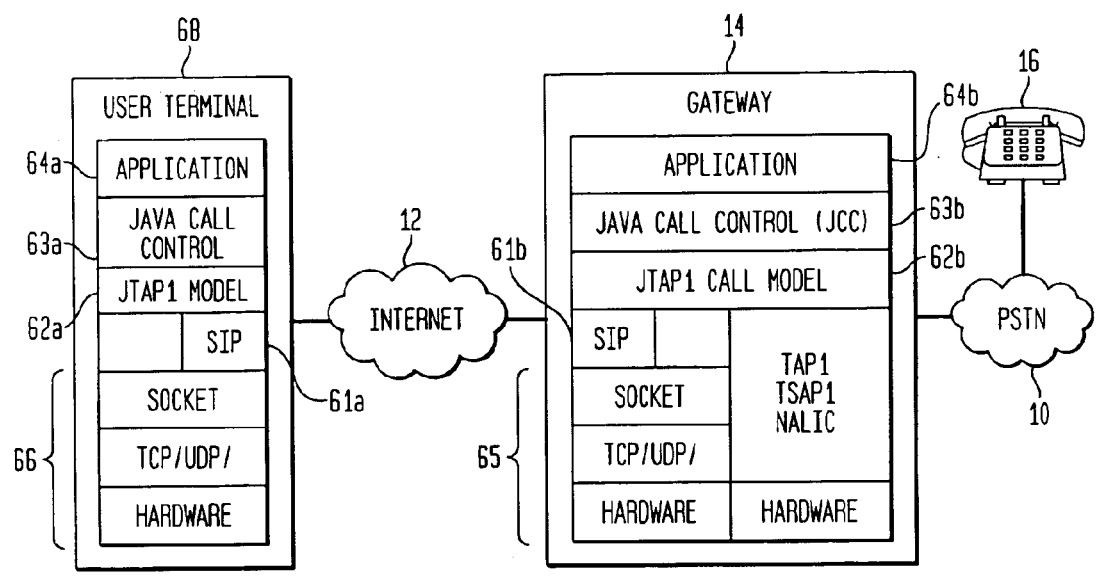
FIG. 6 depicts the software layers within our inventive software object.

The software object itself is structured in accordance with the functional software layers understood by those who practice in the art. FIG. 6 illustrates the functional layers of a software object developed in accordance with our invention. Our new software object would be comprised, in a PC or other smart user terminal 68, of a Session Initiation Protocol (SIP) session control protocol 61a or an equivalent (e.g. H.323), the JTAPI call model software 62a, our inventive JCC software 63a, and the service application 64a, the software 61a, 62a, 63a, and 64a supporting the PC hardware and low-level software designated 66 and with the PC 68. As implemented in a gateway 14 between the PSTN 10 and the internet 12, the software object comprising the SIP 61b, the JTAPI call model 62b, the JCC software 63b in accordance with our invention, and the service application 64b would operate and interface with the gateway hardware and low-level software 65 within the gateway 14. The advantage to this layers approach to the software implementation in accordance with our invention is that our JCC software 63a, 63b offers a high-level API to the applications software 64a, 64b, thus freeing them for the tasks of call-state maintenance.

B. Service Architecture

Figure 4:
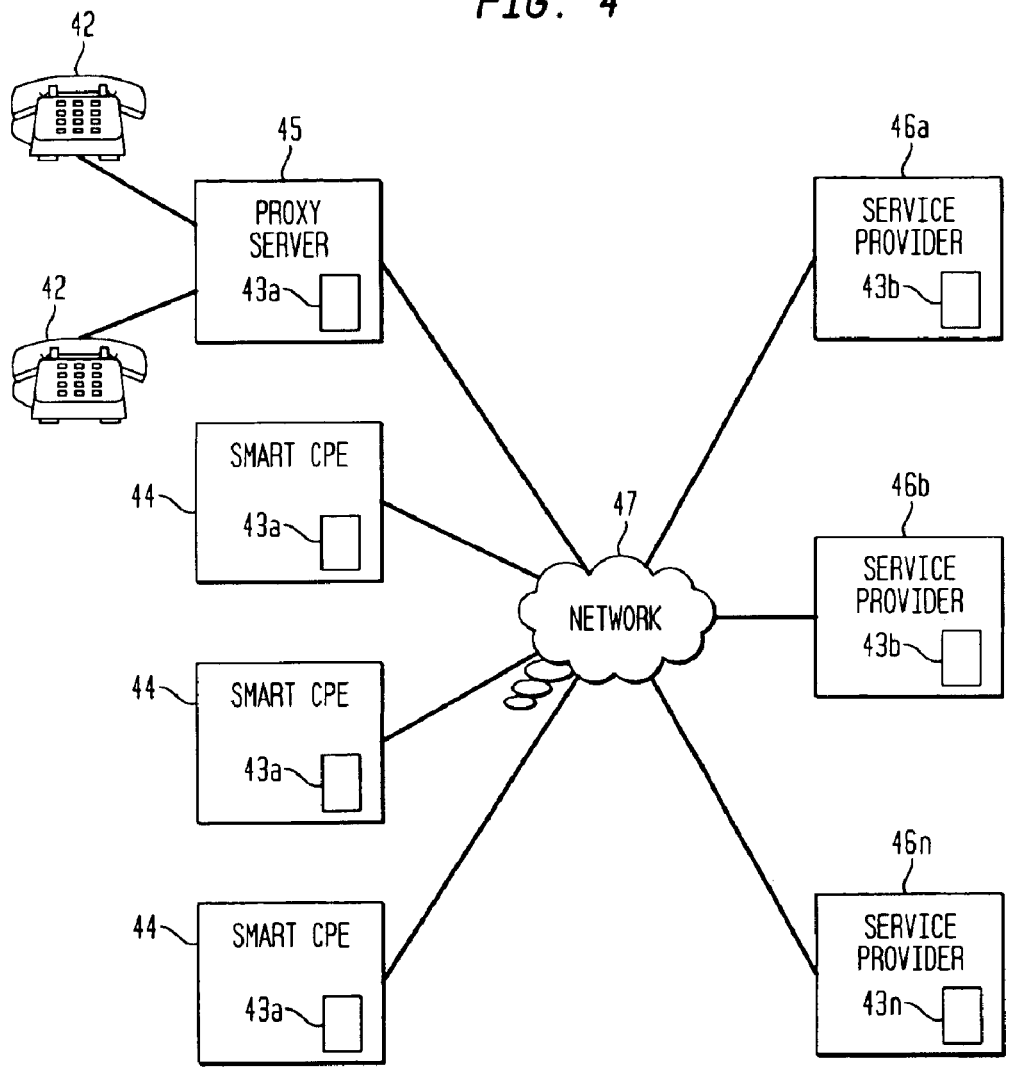
FIG. 4 depicts our inventive service architecture.

Our new service architecture consists of two main software entities: Endpoints and Providers. FIG. 4 illustrates a network designed in accordance with our invention. Endpoints 42 and 44 are entities with a single unique logical address (which may be a phone number or an Internet address) in the system. Services are accessed by Endpoints 44 through a Terminal Manager (TM) 43a, either resident within the terminal 44 or, in the case of dumb terminals 42, resident in a proxy server 45. A user's terminal may be a black phone, a wireless handset, a laptop, or a workstation.

While endpoints 42 and 44 have a single logical address, service providers 46 manage disjoint sets of such addresses, called domains, and provide network connectivity through the network 47 and session management for the corresponding endpoints 44 and 45. As an example one JCC enabled provider 46a, in accordance with our invention, manages the call processing logic, defined as a state machine, among peer TMs 43a. Similarly another JCC enabled provider 46b manages the call processing logic among another set of peer TMs 43b. In accordance with our invention, services can be hosted by providers 46 or directly by the TMs 43, or both.

Services traditionally provided in the PSTN can be permanently installed and constantly active at a provider. For instance, an 800-number translation service, which maps 800-numbers to a physical access line number (or an Internet address), can be offered by a Provider for its domain. The number translation can take place in a transparent way during a normal session setup when the caller application requests a connection to a peer identified by the 800 number. (The actual 800-number database could be installed at a provider, or the provider could itself access a database offered by a service provider via the network.) Alternatively, a service can be provided by the user's terminal management (TM) software. For instance, a speed-dialing service, in which important or frequently dialed numbers are mapped to single digits (represented as hardware or software buttons on the user's terminal) could be provided by the TM. Whether a particular service is provided by a TM or a provider depends upon several factors, one consideration being that a service that is likely to be shared by many TMs (e.g. 800-number translation) may be better located at the provider, while services that are very specialized or user-specific may be better located at a TM.

Figure 5:
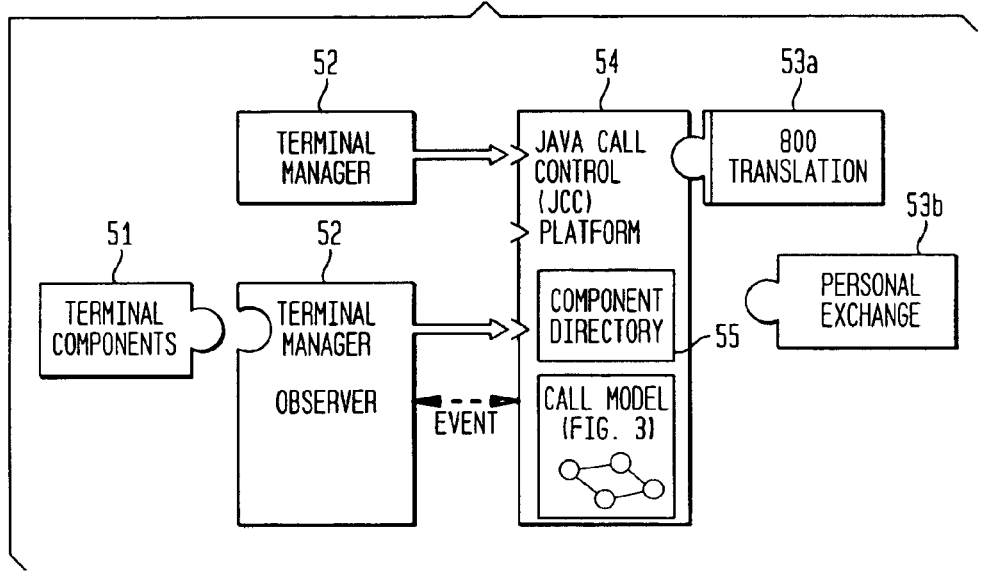
FIG. 5 illustrates our service components within our service architecture.

In our invention services are provided by software components that plug-in to the TM or the provider. FIG. 5 illustrates the relationship between the service components and the TMs and providers. Two types of dynamic resources provide access to services. The first consists of terminal components 51 that can be attached to a TM 52 statically, or dynamically during call setup, and typically are user-specific or specialized services. The second type of resource comprises provider components 53 which implement services that typically are shared amongst TMs in the domain and can be inserted into the Java Call Control Platform 54. A terminal component is implemented as a software component (e.g. a JavaBean) that is analogous to (or, depending upon the service, could in fact actually be) a Web applet. A provider component is implemented as a software component (e.g. a JavaBean, Enterprise Java Bean, or a "CORBA Component", Developing Java Beans, R. Englander, Eds., O'Reilly & Associates; 1997; JavaBeans™ 1.01 specification, available at http://java.sun.com/beans/docs/spec.html; CORBA Component Model Draft Specification, available at http://www.omg.org/cgi-bin/doc?ptc/99-10-10') that is analogous to a Web servlet. (One simple definition of servlets is that servlets are to Web servers what applets are to Web browsers.) An example of a terminal component is a JavaBean that provides a speed-dialing service. An example of a provider component is an Enterprise JavaBean that maintains a cache of 800-number translations, and if a dialed number is not available in the cache, contacts a database offered by an 800-number service provider to obtain the translation.

The motivation for implementing services as software components is that, in principle, different third-party software vendors can provide competing implementations of the same service. For instance, a provider may remove one vendor's implementation of 800-number translation and replace it with another vendor's implementation that offers better functionality (e.g. is more up-to-date), performance (e.g. better caching or search algorithms) or cost. Current software component technology, like JavaBeans and Enterprise JavaBeans, offers support for discovering the attributes of a software component at run-time by means of standardized naming conventions, and, given further standardization of the service interface itself, allowing components to be "plugged-in" for use dynamically.

Provider components 53, such as components 53a and 53b depicted in FIG. 5, are registered in a component directly 55 and can be activated either by a TM or implicitly by the platform 54. The 800 number translation service is an example of the latter. A request for a connection to an 800 number triggers the service invocation on the platform. Once the service invocation returns with the translated destination number, the provider completes the connection. Notice that there is nothing preventing a provider implementation from exposing the service to the TM for a direct invocation.

The issue of managing software components in our invention is similar to that of managing applets and servlets in a Web-based client-server environment. In general, in our invention services are registered as software components in a Component Directory. In the case of Terminal Components, our implementation only allows for services that set up communications sessions with different types of media. Thus services are represented by media types, which are described using the familiar notion of Multipurpose Internet Mail Extension (MIME) types. So for instance, suppose that during call setup the caller requests the use of a whiteboard. A specific MIME type, say "media/whiteboard", is used for the request. On the called party's side, if a Terminal Component is associated with the requested type, then the call can be immediately accepted and the component can be activated. Otherwise, an attempt will be made to obtain a resource that can be associated with that MIME type, using dynamic service download.

Figure 7:
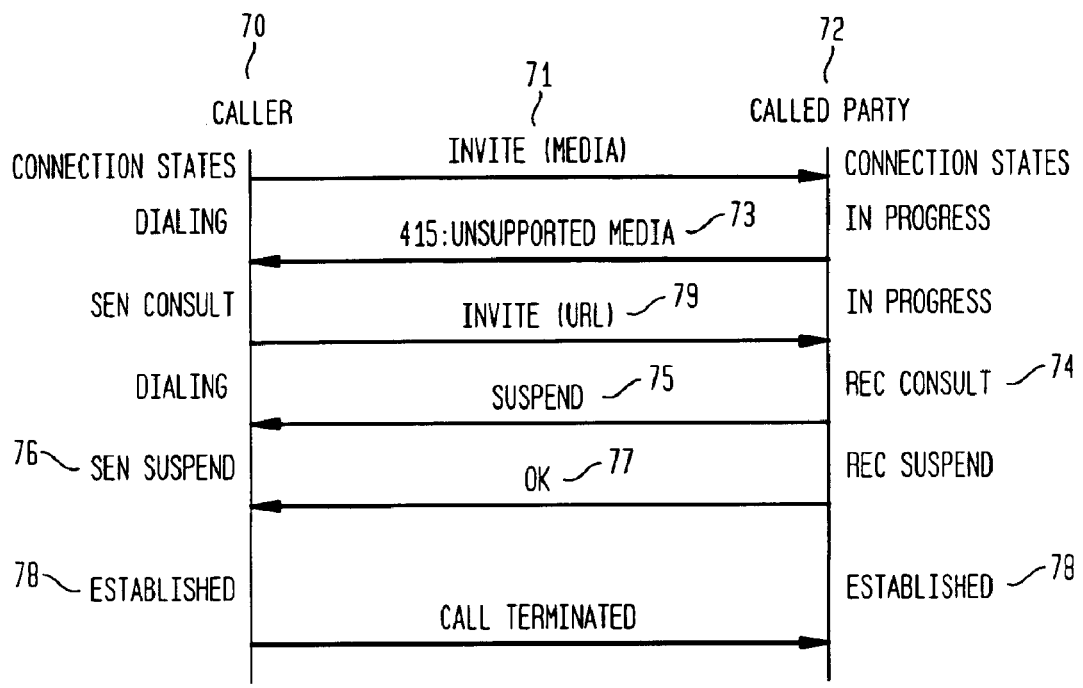
FIG. 7 illustrates the message flow for dynamic service download.

Our extended connection state machine, FIG. 3, along with extensions to Session Initiation Protocol (SIP) enables the dynamic service download. SIP is extended with new protocol states, in order to allow parties to negotiate the use of external services that can be activated on demand during session setup. FIG. 7 illustrates the dynamic service download example. The caller 70 initially sends an INVITE message 71 to a party 72 specifying the use of a particular media type. If the called party 72 does not have a resource corresponding to that media, it can respond with an UNSUPPORTED_MEDIA message 73, which moves the caller's connection state to Sender-consult. In this state, the caller's TM 70 has a chance to provide a suggestion 79 to the called party 72, indicating a third-party service provider, reachable through a Uniform Resource Locator (URL), which may be able to supply the resource. If the called party 72 accepts the suggestion, it initiates a negotiation with the third-party provider. Since this operation takes place during call setup but is in fact conducted with a party not involved in the call, the connection for the called party 72 moves to the Receiver_Consult state 74. In this state the called party end may be consulted, e.g. to authorize payment for or download of the service. The caller 70 is notified of the suspension through a SUSPEND event 75, and its connection is moved to Sender_Suspend state 76. When the called party 72 has terminated the acquisition of the resource, it notifies the caller 70. In case of an OK message 77, the caller 70 then resumes its processing by moving the standard (JTAPI) Established state 78. Notice that at any point of time, either party can unilaterally decide to disconnect the call and return to the IDLE state. Also, various timeouts, not indicated in the figure, are set up in order to provide an upper bound on the negotiation time. The remaining standard state transitions are defined in the JTAPI documentation.

Another example of the use of the JCC of our invention for programming complex user-level sessions, together with media negotiation, is the support for concurrent sessions between the same TMs. Consider the example scenario of a business card exchange service. Suppose that, during a session, (after a call has been set up), two users want to exchange their business cards within that session. That is, incidentally, a common problem when business is conducted over the phone and a buyer is repeatedly requested to supply her name, phone number, address, etc. (business card information format is in fact being standardized, and software for performing this function in limited domains, e.g., between PalmPilot hand-held personal computers, is available.) Suppose also that such a card exchange service is in fact available to the users through a third party.

A straightforward way to accommodate this scenario in a service architecture in accordance with our invention is to consider business cards as a new media type. Supporting mid-call negotiation to exchange this media, however, would further complicate the call model. The alternative we use is to start a new call, in which the new media is included during setup, and then manage the logical relationship between the old and the new call. This alternative provides an opportunity to introduce and experiment with dependent relationships between calls, simplifies the design of the Provider for the support of complex interactions, and offers more flexibility to the users. The same Address Objects and Terminal Objects share a number of active calls. Each call connection with the Endpoint is represented by a different connection and terminal connection object.

A higher-level session between TMs consists of all the calls shared by those TMs. Each call can be handled independently, or an explicit parent-child relationship can be enforced among them. In the case of the business card exchange, for instance, the TMs could specify whether terminating the main session would imply the termination of all the further calls that were setup during that session. Managing related calls is also useful for billing. For instance, calls that belong to the same high-level session can be billed together, possibly at a discount.

In our illustrative embodiment, SIP is used as the common signaling protocol among distributed providers. Compared to other proposed protocols, such as H.323, SIP offers the advantages of specification and implementation simplicity, extensibility, and neutrality with respect both to the transport protocol and to address format. The protocol is text-based, much in the spirit of HTTP, and is designed to be part of a larger suite of session management protocols for the internet, that includes for instance the Service Location Protocol (SLP) as well as the Session Definition Protocol (SDP). Namely, we used SIP's features to define specific messages for suspending and resuming a session, for suggesting service providers' URLs, and for informing a party of the unavailability of a resource.

Our inventive architecture can be deployed in various ways to provide for scalability and, potentially, for fault tolerance. In the distributed deployment each provider is responsible for a partition of the global address space, and providers communicate using SIP as their common signaling protocol. In the centralized, "PBX-like" configuration, one single provider manages all the connections, as well as the interface with the PSTN. Other intermediate configurations are possible, ranging from applications that run on top of a dedicated provider, to one centralized call center with only one provider. Providers and endpoints can themselves be connected remotely, or they can be co-located on a host.

Another advantage of the distributed nature of our inventive call model is that it can scale reasonably well with the size of the address space, i.e., ultimately, with the number of endpoints in the network. In fact, while one provider manages an entire partition over the global address space, the partitioning itself is quite arbitrary. This makes it possible to introduce new providers and to reassign addresses to providers as needed in order to balance the load across all of them. Address resolution currently remains a centralized operation that can limit scalability. In our invention, address resolution is done simply by mapping a logical address to the IP addresses and port number of the Provider responsible for that address. The mapping table is managed by a translator server that is, in principle, distinct from all of the providers. A call is setup by contracting the involved provides through the IP address returned by the translator. Each provider will then internally route the call to the appropriate TM, by setting up the call model as described earlier. Several solutions are available for scaling the translation step to a large number of addresses, such as hierarchical resolution.

Another clear benefit of provider distribution is its potential for fault tolerance. We can take advantage of the fact that each call object contains the full call model, i.e., it models all the legs of a call, to provide replication across providers for every single call. In the case of a single provider (i.e., of a "local call"), a detached hot-standby provider can be used for replication.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

APPENDIX

| | |
|---|---|
| AIN | Advanced Intelligent Network |
| API | Application Programming Interface |
| CTI | Computer Telephony Integration |
| HTTP | HyperText Transport Protocol |
| ISCP | Intelligent Service Control Network |
| IP | Internet Protocol |
| IT | Infromation Technology |
| JCC | Java Call Control |
| JTAPI | Java Telephony Application Programming Interface |
| MIME | Multipurpose Internet Mail Extension |
| PSTN | Public Switched Telephone Network |
| RMI | Remote Method Integration |
| SDP | Service Definition Protocol |
| SIP | Session Initiation Protocol |
| SLP | Session Location Protocol |
| TAPI | Telephony Application Programming Interface |
| TM | Terminal Manager |
| TSAPI | Telephony Server Application Programming Interface |
| URL | Uniform Resource Locator |

What is claimed is:

1. In a communication system including a calling and a called party and a plurality of providers which can provide a plurality of individual additional services or functions for a communication between a calling and a called party, a method for providing one such individual service or function from one of said plurality of providers, said method comprising the steps of:

establishing a communication connection between the calling and called parties;

suspending said connection if one of said calling or called parties needs to add a resource from one of the providers for an additional service or function to be employed for the communication between the parties;

under control of one of the parties, establishing a separate connection to one of the providers to obtain the additional resource;

providing said resource to a control platform which is distinct from the terminals of the parties to the communication, said providing including inserting said resource into said control platform; and under control of said control platform, making said additional service available to at least one of said parties.

2. The method in accordance with claim 1 wherein said control platform includes a call model including a Sender\_Consult state, a Sender\_Suspend state, a Receiver Consult state and a Receiver\_Suspend state for tracking communications between the calling and called parties during the suspension of said connection between the calling and called parties.

3. In a communication system including a plurality of subscribers and a plurality of providers which can provide a plurality of individual additional services or functions to said subscribers, a method for providing an individual one of said services or functions from one of said providers while a communication is in progress between two of said subscribers, said method comprising the steps of:

one of said subscribers advising the other of said subscribers of the desire to employ a particular resource for a service or function in connection with the communication between said subscribers and inquiring if said other subscriber has the resource;

if said other subscriber does not have such a resource, said other subscriber initiating acquisition of the resource from one of the plurality of providers and moving the communication connection between said subscribers to a suspend state;

upon said other subscriber acquiring said resource, sending a message from said other subscriber to said one subscriber advising that the resource has been acquired; and resuming the communication between said subscribers.

4. The method in accordance with claim 3 further comprising the step of said one subscriber recommending a particular one of said plurality of providers to said other subscriber.

* * * * *